Oct. 29, 1935.    N. GYMNAITES    2,018,849
WATER COOLER AND FILTER
Filed March 28, 1934    3 Sheets-Sheet 1
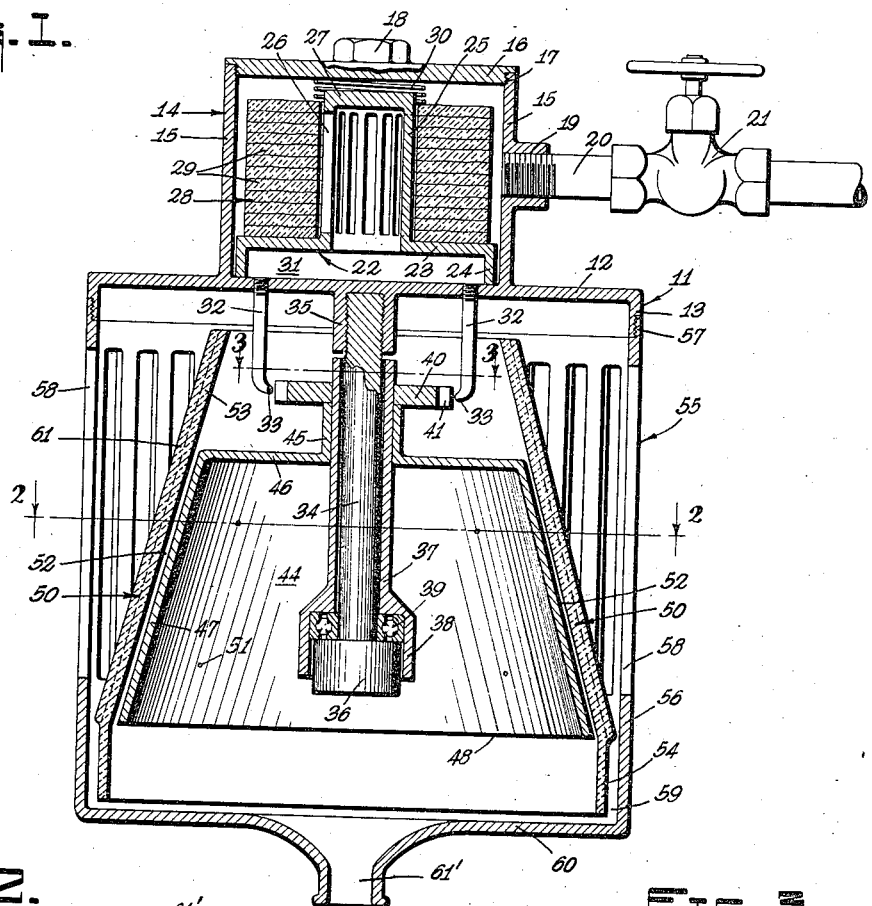

Oct. 29, 1935. N. GYMNAITES 2,018,849
WATER COOLER AND FILTER
Filed March 28, 1934 3 Sheets-Sheet 2

INVENTOR
N. GYMNAITES
By Hazard and Miller
ATTORNEYS.

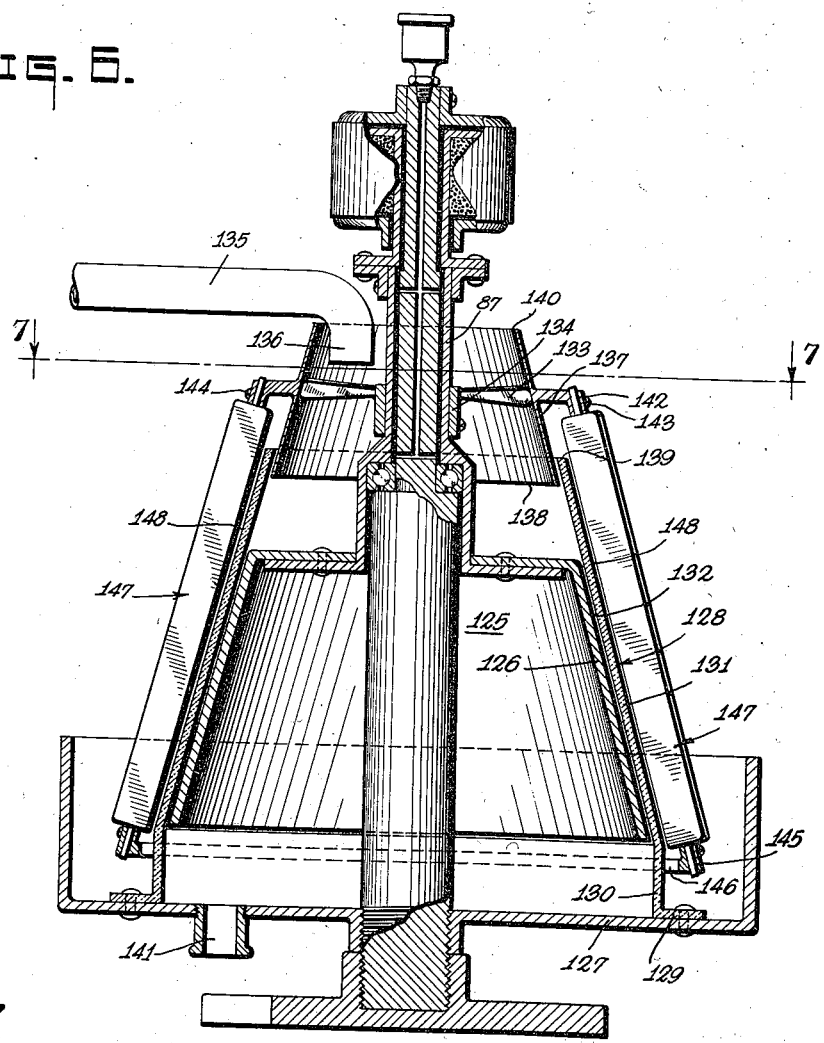

Patented Oct. 29, 1935

2,018,849

UNITED STATES PATENT OFFICE 2,018,849

WATER COOLER AND FILTER

Nickolas Gymnaites, Ventura, Calif.

Application March 28, 1934, Serial No. 717,751

23 Claims. (Cl. 62—155)

My invention relates to a water cooler of a type in which the water is cooled by air evaporation of a portion of the water thus causing a cooling of the remaining water.

An object and feature of my invention as to the water cooler consists of flowing water downwardly in a thin film in which one side of the film is in contact with a porous body through which a certain portion of the water seeps by capillary attraction and is brought into contact with the air on the outside of the porous sheets or slabs.

A further object of my invention is forcing the water through the porous material by centrifugal action, in that the porous structure is preferably made in the form of a frustrum of a cone which is rapidly rotated and the water is driven or spread against the inside upper surface of this frustrum.

Another feature of my invention in the formation of the thin film of water in contact with the porous cone consists in providing an imperforate and non-porous spacing body which is also formed as a frustrum of a cone and is secured to the rotating porous cone and slightly spaced therefrom, thus providing a conical shaped downward passage for the water in a thin film. Thus, a large surface of water is brought into contact with the cooled rotating porous cone.

Another feature of my invention is causing the porous cone to rotate exposed on its outside surface to direct contact with the air and this in one form of my invention is done by enclosing the rotatable cooling structure in a housing which is provided with vertical slots or openings to accommodate the flow of air so that air, after absorbing moisture is freely discharged through the slots and fresh dry air enters, the circulation of the air being from the top towards the bottom.

Another feature of my invention is in providing air contacting fins on the rotatable porous cone to form a better contact with the air and also in one form of my invention, to direct the air flow into contact with the rotating porous cone.

In the matter of the flow of water, this is received at the upper part of the cooler above the spacing body, the water stream is broken up into minute particles either by beaters or fans, or by the vanes of a water motor, and thrown by centrifugal action against the upper inside part of the porous cone.

In one form of my invention, I use a water motor to rotate the porous cone and its spacer. This water motor has a water driven wheel connected to the spacer which is supported on a vertical shaft. There may be a plurality of jet nozzles discharging water directly on to the periphery of the water rotor which may be constructed somewhat on the type of an impulse water wheel.

In another form of my invention for drawing large quantities of cooled water, I preferably drive the cooling porous cone and the spacer by an electric motor in which the rotary elements are mounted on a vertical shaft having its support at the base of the cooler. This rotor is directly connected to an electric motor attached to the top of the column or post, the motor being connected to the rotor by a rotatable sleeve. In this construction it is preferable to use water beaters on which the intake water impinges, these beaters breaking up the water into fine particles and throwing these against the porous cone.

Another feature of my invention consists of a water filter used in connection with the cooler to remove all sediment and the like, from the water. This preferably consists of a stack of flat rings of porous material such as porous clay, the rings are stacked one on top of the other and held pressed together. The whole stack is in a water tight container in which there is an inlet on the outside of the filter back. The water is forced radially through the porous filters and through the minute space between one layer and the other of the rings. The water is then discharged downwardly through the center of the porous pack. This discharged water in the hydraulically driven cooler is used to rotate the cooler and in a power driven cooler, the discharge water from the filter impinges on the water beaters.

My invention is illustrated in connection with the accompanying drawings, in which:

Fig. 1 is a vertical section which may be considered as taken on the line 1—1 of Fig. 2 in the direction of the arrows showing a water motor type of rotary cooler with the water filter superimposed.

Fig. 2 is a horizontal section on the line 2—2 of Fig. 1 in the direction of the arrows.

Fig. 3 is a horizontal section on the line 3—3 of Fig. 1 in the direction of the arrows showing the water motor.

Fig. 6 is a vertical section substantially on the line 6—6 of Fig. 7 in the direction of the arrows and is a modified construction of that shown in Fig. 4.

Fig. 7 is a transverse section on the line 7—7 of Fig. 6 in the direction of the arrows.

Figure 4:
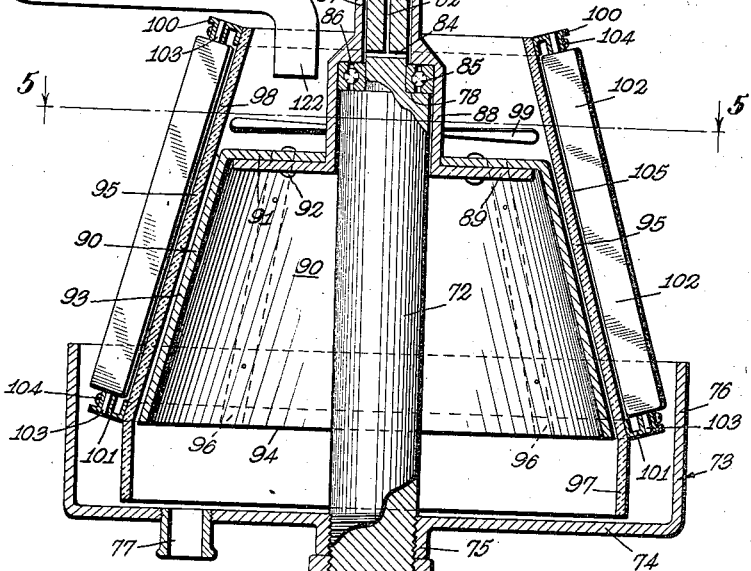
Fig. 4 is a vertical section of a modified form of my invention through the power driven cooler and may be considered as taken on the line 4—4 of Fig. 5 in the direction of the arrows, the air deflecting vanes being shown in elevation and omitting the water cooler.

Referring first to the construction of Figs. 1, 2, and 3; in these there is a supporting head 11 having a cap piece 12, and a vertical flange 13. On the cap piece I construct the water filter 14. This has a cylindrical wall 15 extending upwardly from the cap 12 and is provided with a cover 16 having a screw threaded connection 17 to the wall 15 threaded into place by means of a wrench head 18. An opening 19 is provided at the side to which is connected the inlet water pipe 20, this pipe having a valve 21 therein.

The filter base 22 has a base plate 23 with a downwardly turned flange 24, the flange resting on the cap 12 inside of the cylindrical wall 15. A tube 25 extends upwardly from the base and has a series of vertical slots 26 therein and a closure head 27 at the top. A filter stack or pack 28 is composed of a series of flat rings 29, each formed of a filter material such as a burnt clay filter. These are preferably fairly flat on their upper and lower surfaces so when they are made into a pack and rest on the base 23 they will have a reasonably close fit. The individual plates or rings of the pack are held into close contact by means of a compression spring 30 which bears on the upper filter ring and presses against the cap 16. The water is thus forced radially through the individual filter rings and also through the contact surface of one ring with another and the water is discharged downwardly through the tube 25 entering through the slots 26 and may accumulate in the space 31 below the base 23. This water is then carried downwardly by the motor feed pipes 32, each having a discharge nozzle 33.

A vertical post or column 34 is threaded or otherwise secured at its upper end to a socket 35 formed on the under side of the cap 12. This post is stationary and has a fixed head 36 at the bottom. A rotatable sleeve 37 has an enlargement 38 at the bottom forming a recess in which is located the anti-friction bearing 39.

Attached to the sleeve 37 in any suitable manner there is the water impeller wheel 40 which is illustrated as having a plurality of vanes 41 forming water buckets 42 between the vanes on which the water from the jet nozzles 33 impinges, these being placed at an angle to the periphery of the water wheel so that this wheel turns in the direction of the arrow 43 of Fig. 3.

The water cooler proper consists of a spacer element 44 which has a collar 45 keyed or otherwise secured to the sleeve 37. Below this collar and formed integral therewith there is a top flat structure 46 and depending from this an outwardly flaring skirt 47. The skirt forms a frustrum of a cone and is open at the bottom 48. A series of spacing strips 49 are located on the skirt and preferably extend longitudinally thereof and function to space the cooler cone 50 from the skirt 47. This cone is secured by screws 51 to the straps 49 and the straps are also secured by the screws to the skirt 47. This leaves a thin annular water space 52 between the skirt 47 and the cooler cone 50 except for the spacing straps 49. This cooler cone is formed of filter material such as a porous clay product. The upper portion 53 extends above the top 46 of the spacer and also well above the water wheel 50. The lower end of the cooler cone has preferably a cylindrical section 54 which extends below the bottom 48 of the spacer 44.

A casing 55 has a cylindrical side wall 56 which is illustrated as having a threaded connection 57 to the flange 13. This vertical wall is provided with a series of vertical slots 58 to accomodate a free flow of air. A water receptacle 59 is formed at the bottom of the casing by the horizontal bottom wall 60 which has a discharge spout 61 for discharge of the filtered and cooled water. In order to effect a better contact of the cooler cone with the air, a plurality of ribs 61' are formed integral with the outside of the porous cone 50.

The manner of operation and functioning of the air cooler of Figs. 1, 2, and 3 is as follows:

The water is forced through the filter under pressure and hence is discharged from the nozzle jets 33 as a pressure discharge. This water, in impinging on the vanes and buckets of the water rotor, rotates the sleeve 37 which is mounted on the ball bearing 39 and supported on the post 34 gives a rapid rotation to the sleeve and hence to the spacer 44 having the skirt 47 and the attached cooler cone 60. The water impinging in the buckets is thrown outwardly and spread by centrifugal force against the upper portion 53 of the cooler cone 50 and runs by gravity down the interior surface of this cone and through the annular space 52 in the form of a thin conical film of water.

A certain amount of water is forced through the porous cone by centrifugal action and also is conducted by capillary attraction. The outside of the cooler cone exposes a large surface to the air entering through the slots 58 in the case or covering 55 and thus the water is evaporated rapidly from the outside of the cooler cone. The ribs 61 also become coated with moisture which is readily taken up by the air due to the projection of the ribs contacting with a large body of air. This action cools the cooler cone and extracts heat from the thin descending conical film of water, which water is discharged into the water receptacle 59 and through the outlet spout 61. Due to the large number of slots 58 there is a free flow of air, the moisture laden air, as it also is chilled will flow out of the lower portions of the slots 58 and relatively dry air enter at the top of these slots thus giving a continued air circulation. In addition, a certain amount of air may be discharged through the outlet spout 61. With this type, when no water is being drawn, the water motor and cooler is at rest, but if desired, if a continuous supply of cooled water is required, the valve may be left open and the water cooler run continuously.

Figure 5:
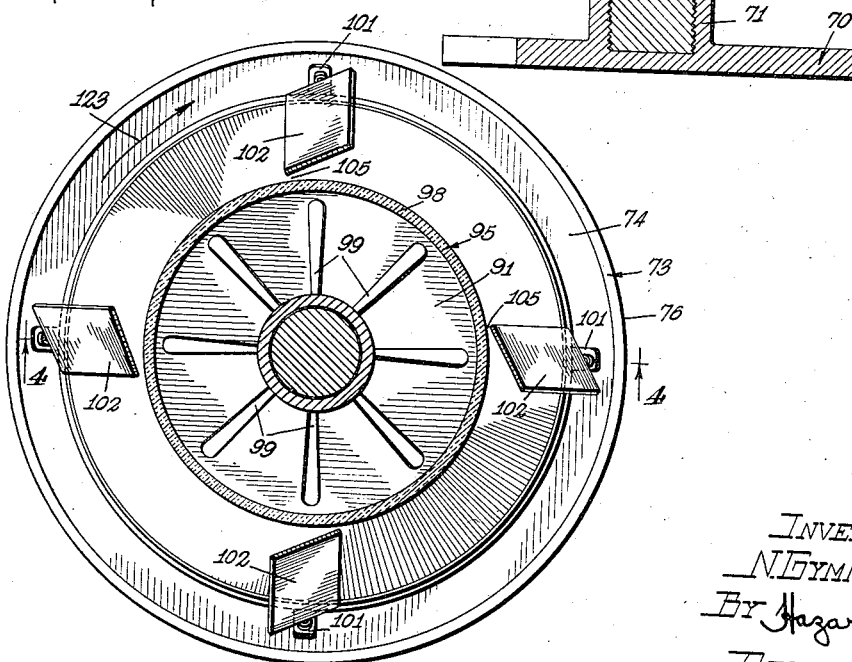
Fig. 5 is a horizontal section on the line 5—5 of Fig. 4 in the direction of the arrows.

In the construction of Figs. 4 and 5 I utilize a supporting base 70 having a socket 71 in which is located a stationary post or column 72, this being illustrated as threaded in the socket. A water receptacle 73 has a bottom wall 74 and a collar 75, the collar being threaded on the post 73 and resting on the socket structure 71. This receptacle has an outer cylindrical wall 76. A discharge outlet 77 is located in the bottom wall.

The manner of mounting the rotor and the electric driving motor is as follows:

The upper end of the post or column 73 has a horizontal shoulder 78 and an upwardly extending reduced section 79 having a further shoulder 80 and an upper section 81 of still less diameter. These upper sections have an axial bore 82 connected at the top to a grease cup 83 and there are provided lateral greasing outlets 84.

An anti-friction bearing 85 engages a shoulder 86 on a sleeve 87, this sleeve being rotatable and on this bearing and the shoulder 78. The sleeve has a dependent skirt 88 with a horizontal flange 89 at the bottom. The rotor spacer 90 has a horizontal upper structure 91 resting on the flange 89 and secured thereto by rivets 92. A downwardly depending skirt 93 is formed as a frustrum of a cone and is open at the bottom 94. A porous cooling cone 95 is formed as a frustrum of a cone and is attached to the skirt 83 by strips 96 similar to the strips 49 of Figs. 1 and 2, the cone and the skirt being secured by screws, or the like. The cone has a depending section 97 below the bottom 94 which is preferably cylindrical, and has an upward extension 98 leading preferably above the bearing 85. The skirt 88 of the sleeve 87 has a plurality of beater arms 99 secured thereto and extending outwardly radially.

In order to increase the air cooling effect, a series of bearing lugs 100 are secured to the upper outside edge of the filter cone and a second series 101 are secured adjacent the bottom of this cone, and in these bearings, there are adjustable air deflecting vanes 102 having short stub shafts 103 at each end. Set screws 104 through the bearings clamp the stub shafts so that the relative angle of the vanes 102 to the cooling cone may be adjusted and the size of the space 105 between the fins and the cone regulated.

The manner of driving the rotor and the cooler cone is as follows:

The sleeve 87 is connected by an angle ring 106 to the lower flange 107 of a tubular shaft 108 forming part of the rotor and the armature section or electric motor designated by the assembly numeral 109. This motor has the stationary frame structure 110 having a flange 111 secured to the upper end of the top section 81 of the post or column 73. A lower flange section 112 has a clearance outside of the tubular shaft 108, thus the frame and fields coils of the motor are held stationary on the post or column and the armature with the tubular shaft 108 rotates when the motor is energized thus rotating the sleeve 107, the spacer 90 and the porous cone cooler with its vanes.

The water is preferably fed through the water filter 113 which is of the same general character as that described in connection with Fig. 1, except in this case, the base 114 is illustrated as having an inwardly extending tubular member 115 and a reduced shoulder 116 over the construction illustrated in Fig. 1. The filter discs 117 rest on this shoulder and are pressed downwardly by a compression spring. The water filter may be supported in any suitable manner. An outlet coupling 118 is secured to the tubular member 115 and receives the discharge through the perforated tube 119 at the center of the filter. The water inlet is at 120. The discharge water passes through the pipe 121 to the discharge outlet or nozzle 122 where it is discharged on the beaters 99.

The water broken up by these rapidly rotating beaters forms relatively small drops which are for the most part, driven outwardly by centrifugal action against the upper portion 58 of the cooler cone. The water runs down the cone and through the narrow space between the cone and the skirt 93 of the spacer. A certain amount of this water percolates through the cooler cone 95 to the outside and comes into contact with the air. The cone is illustrated as rotating in the direction of the arrow 123 (note Fig. 5), and thus the vanes or fins 102 deflect the air against the outside surface of this cooler cone, thus cooling the water by extracting heat therefrom and thereby cooling the thin film of water flowing downwardly between the cone and the skirt 93. The cooled water collects in the receptacle 73 and is discharged through the outlet 77.

While I have designated that the porous filter slabs and the cooling cone may be a porous product, it is to be understood that these may be formed of porous clay or other suitable material, or even a porous rustless metal. It is also to be understood that the device may be used to cool other liquids than water and also may be used as a filter for other types of liquids. It is also obvious that in the power driven cooler any other suitable power means may be substituted for the electric motor.

In Figs. 6 and 7 I have shown a modified construction over that of Figs. 4 and 5. In this case I provide a supporting base, a column with a driving motor mounted on the tube, together with a spacer 125 substantially the same as in the construction of Figs. 4 and 5. This spacer has a flared skirt 126. In this case, however, the water receptacle 127 supports the water cooler cone 128 which is illustrated as having a horizontal flange 129 secured to the floor of the water receptacle from which extends a vertical cylindrical section 130 and the cone shaped portion 131 of the cooler. This is so mounted as to leave an annular narrow space 132 between the skirt of the spacer and the cooler cone.

In this case, the beater arms 133 are illustrated as attached to a collar 134 which is thus secured to the sleeve 87 driven by the electric motor. The water inlet is through the pipe 135 which has a discharge nozzle 136 discharging the water on the beater arms.

Secured to the outer end of these beater arms there is a thin cone shaped supporting ring 137. This ring has the same flare as the skirt and the cone part of the water cooler and is located with its lower portion 138 extending below the top 139 of the cooler and with its upper portion 140 extending above the beaters. This upward extension prevents the water spread by the beaters and thrown up by centrifugal action from being discharged out of the open top of the supporting ring 137. The water thrown downwardly on the inside of this ring 137 comes in contact with the spacer 125. The spacer throws the water outwardly by centrifugal action and forms a thin film of water in the annular space 132 between the skirt of the spacer and the cone part of the cooler. On account of this contact with the spacer skirt which is rotating, the water deflects a centrifugal action which functions in part to force it outwardly through the pores of the water cooler cone. The water also flows downwardly and is trapped in the water receptacle, from which it may be discharged from the outlet pipe 141.

In order to bring a large volume of air into contact with the outer surface of the cooler cone I provide a plurality of bearing brackets 142 secured to the outside of the conical supporting ring 137. A shaft 143 is adjustably mounted in each bracket being secured thereto by a set screw 144 and on the upper part of this shaft there is a lower bearing 145 also having a set screw, this bearing being mounted in a ring 146 which is spaced outside of the cylindrical section 130 of the cooler cone. Secured to each shaft 143 there is an air deflected vane 147. These vanes may be adjusted to vary the space 148 between the inner edge of the vane and the outside of the cooler cone, and on account of the adjustability of the vanes, the amount of air draft on the outside of the cooler cone may be varied. These vanes thus rotate around the stationary cooler cone and by bringing a large volume of air into contact with the outer surface, increases the evaporation of the moisture which has in part, been forced through the cooler cone and partly by capillary attraction. The cooler cone being chilled, causes a cooling of the thin film of water between this cone and the skirt of the spacer. It will be understood that I may deflect the air in any suitable manner to impinge on the cooler cones other than by the vanes shown in Figs. 4 and 6.

Various changes may be made in the details of construction without departing from the spirit or scope of the invention as described in the appended claims:

I claim:

1. A water cooler having a rotatable thin ring-like porous structure of a considerable length considered vertically, means to flow water downwardly on the inside of said structure, and means to confine the water to a thin film whereby the film is cooled by evaporation of water from the exterior of said structure.

2. A water cooler as claimed in claim 1, a centrifugal acting means to spray water on the upper inside portion of the said ring-like structure.

3. A water cooler having a porous ring-like structure mounted to rotate on a vertical axis, said structure being thin in a radial direction and comparatively long in an axial direction, and means to spray water on the upper inside surface of the said structure, means to confine the water to a thin film on the inside of the rotatable ring-like structure.

4. A water cooler as claimed in claim 3, the means to spray the water comprising a rotatable spraying means rotating on the same axis as the said ring-like structure, the feed water impinging on the said spraying means and being discharged outwardly by centrifugal action.

5. A water cooler having a cooling element forming a frustrum of a cone mounted on a vertical axis, said cooling element being comparatively thin in a radial direction and long in an axial direction, means to rotate the cooling element, means to confine water to a thin film on the inside surface of said element whereby the film of water is cooled by evaporation of water on the outside of the rotatable cooling element.

6. A water cooler as claimed in claim 5, means to first contact the water to be cooled at the upper inside portion of the cooling element, and means to discharge the cooled water at the lower end of said element.

7. A water cooler having a thin cone-like porous structure, a spacing element secured to the cone and forming therewith a narrow annular space for the downward flow of water, a vertical column forming a support for the spacer element and cone, means to rotate the spacer element and cone as a unit, means to flow inlet water on the inside surface of the upper end of the cone structure and means to discharge cooled water below the lower end of the cone structure.

8. A water cooler having a vertical column, a spacing element rotatably mounted on said column and having a skirt forming a frustrum of a cone with the apex upwardly, a cooler cone secured to said skirt and spaced therefrom, said cooling cone being porous and comparatively thin in a radial direction compared with its length in an axial direction, the outside of said cone being exposed to air on rotation, and means to flow inlet water above the spacing element to form a thin annular film between the cone and the skirt.

9. A water cooler as claimed in claim 8, the means to flow the water comprising a sleeve connected to the spacing element and rotatable on the said column, a water spreading device secured to the sleeve and rotating therewith, discharge nozzles for water to discharge water on the said device whereby the water is projected by centrifugal action against the upper inside portion of the cone, said upper portion of the cone projecting above the spacing element.

10. A water cooler as claimed in claim 8, the said cone having vanes or fins secured thereto on its outer surface to contact the air on rotation of the cone.

11. A water cooler having a vertical stationary column, a spacing element having a sleeve rotatably mounted on the said column, said spacing element having a substantially horizontal upper surface and an outwardly flared skirt and the skirt forming a frustrum of a cone and being imperforate, a water cooler frustrum of a cone formed of porous material comparatively thin in a radial direction compared with its length in an axial direction, the cooler cone being secured to the skirt and in spaced relation thereto to provide a thin annular space for the downward flow of water, the cooler cone projecting above the top surface of the spacer element, means to flow water on the inside upper surface of the projecting portion of the cooler cone, and a water receptacle at the base of said cone having an outlet for water.

12. A water cooler as claimed in claim 11, a rotating means secured to the said sleeve comprising a water driven wheel with vanes, the means to flow the water to the inside surface of the cone comprising water pipes with nozzles discharging water against the said vanes.

13. A water cooler as claimed in claim 11, means to rotate the spacing element comprising a motor housing mounted on the upper end of the said column, the armature of the motor being connected to the said sleeve to rotate said sleeve.

14. A water cooler having a fixed structure with a vertical column, a sleeve rotatably mounted and supported on said column, a water wheel attached to the sleeve, water inlet nozzles positioned to discharge on said wheel and rotate the wheel and sleeve, the said wheel flowing the water outwardly by centrifugal action, a spacing element secured to the sleeve and having an imperforate skirt forming a frustrum of a cone, a cooler cone secured to and spaced from the skirt, the cooler cone being comparatively thin in a radial direction compared with its length in an axial direction, the space between the skirt and the cone being adapted to accommodate a thin annular film of water, the said cooler cone extending upwardly above the water wheel to receive the water discharged outwardly from such wheel, a water receptacle at the bottom of the cooler cone having an outlet.

15. A water cooler having a supporting structure with a vertical column, a motor mounted at the top of the column and having an armature attached to a rotatable sleeve, the sleeve rotating on the column, water beaters secured to the sleeve and extending outwardly therefrom, a spacing element secured to the sleeve below the water beaters and having a skirt forming a frustrum of a cone with the apex upwardly, a cooler cone formed of porous material secured in spaced relation to the skirt and being comparatively thin in a radial direction compared with its length in an axial direction, the said space being adapted to accommodate a thin annular film of water between the skirt and the cone, means to flow water on the said beaters, the cone extending above the beaters to receive the water discharged outwardly from said beaters by centrifugal action, a water receptacle at the bottom of the cone having an outlet.

16. A water cooler having a supporting structure with a vertical column, a spacing element rotatably mounted on the column and having a downwardly flared skirt, a water receptacle adjacent the base of the column, a water cooler element secured to the water receptacle and having a cone-shaped portion concentric with the skirt of the spacer and forming with the skirt a narrow annular space, a rotatable supporting element connected to rotate with the spacer element and having a plurality of adjustable vanes located outside of the cooler cone and positioned to deflect air into contact with the outer surface of said cooler cone.

17. In the method of cooling water, forcing water outwardly by centrifugal action through a porous body, bringing the outside of said body into contact with a large volume of air and cooling a thin film of water in contact with the inside surface of said porous body.

18. In the method of cooling water as claimed in claim 17, rotating the porous body and confining the film of water to be cooled on the outside by the porous body.

19. In the method of cooling water, rotating a thin, annular film of water on a vertical axis, forcing some of such water outwardly by centrifugal action through a porous body, bringing the outside of said body into contact with a large volume of air and cooling the thin film of water in contact with the inside surface of said porous body and at the same time flowing such film downwardly while cooling it.

20. In the method of cooling water as claimed in claim 19, rotating the porous body on a vertical axis and confining the film of water to be cooled on the outside by the porous body.

21. In the method of cooling water, rotating a thin annular film of water on a vertical axis, increasing the diameter of the annular film from the top towards the bottom by centrifugal action, forcing some of the water of the film outwardly by centrifugal action through a porous body, bringing the outside of said body into contact with a large volume of air and thereby cooling the thin film of water in contact with the inside surface of said porous body, and at the same time flowing such film downwardly while cooling it.

22. In the method of cooling water as claimed in claim 21, confining the film of water to be cooled on its outside by rotating the porous body and maintaining the speed of rotation of the film in part by the rotation of the porous body.

23. A water cooler having a vertical column, a spacing element rotatably mounted on said column and having a skirt forming a frustrum of a cone with the apex upwardly, a cone structure secured to the skirt and spaced therefrom the skirt and the coned structure defining an annular conical space except for the elements securing the skirt and the cone structure, the upper end of said space being exposed to air means to flow water downwardly in said space, whereby a certain amount of air may be carried with the water, the water being forced outwardly by centrifugal action and discharged at the lower end of the said space.

NICKOLAS GYMNAITES.